(12) United States Patent
Yoon et al.

(10) Patent No.: US 10,459,148 B1
(45) Date of Patent: Oct. 29, 2019

(54) DISPLAY DEVICE AND LIGHT GUIDE PLATE

(71) Applicant: MEMSLUX, Daejeon (KR)

(72) Inventors: Jun-Bo Yoon, Daejeon (KR); Keun-Seo Lim, Sejong-si (KR); Shin-Ae Hwang, Daejeon (KR)

(73) Assignee: MEMSLUX (KR)

( * ) Notice: Subject to any disclaimer, the term of this patent is extended or adjusted under 35 U.S.C. 154(b) by 0 days.

(21) Appl. No.: 16/114,869

(22) Filed: Aug. 28, 2018

(30) Foreign Application Priority Data

Jul. 20, 2018 (KR) .................. 10-2018-0085004

(51) Int. Cl.
*F21V 8/00* (2006.01)
*G02B 6/122* (2006.01)

(52) U.S. Cl.
CPC ......... *G02B 6/0031* (2013.01); *G02B 6/0025* (2013.01); *G02B 6/0068* (2013.01); *G02B 6/1221* (2013.01)

(58) Field of Classification Search
CPC .. G02B 6/0031; G02B 6/1221; G02B 6/0025; G02B 6/0068
See application file for complete search history.

(56) References Cited

U.S. PATENT DOCUMENTS

| | | | | |
|---|---|---|---|---|
| 2011/0051402 A1* | 3/2011 | Keller | ................ | F21S 8/06 362/147 |
| 2013/0170218 A1* | 7/2013 | Wolk | ................ | G02B 6/0036 362/296.01 |
| 2014/0063853 A1* | 3/2014 | Nichol | ................ | G02B 6/0028 362/616 |
| 2014/0140091 A1* | 5/2014 | Vasylyev | ............... | G02B 6/001 362/606 |
| 2017/0126944 A1* | 5/2017 | Jagt | ................ | G03B 15/05 |
| 2017/0285348 A1* | 10/2017 | Ayres | ................ | G02B 27/0172 |

FOREIGN PATENT DOCUMENTS

| | | |
|---|---|---|
| KR | 20070066218 A | 6/2007 |
| KR | 10-2012-0009397 | 2/2012 |
| KR | 20160047440 A | 5/2016 |
| KR | 2017-00110770 | 10/2017 |
| KR | 10-2018-0058308 | 6/2018 |

OTHER PUBLICATIONS

Korean Office Action issued by the KIPO dated Aug. 5, 2019, pp. 1-26.

* cited by examiner

*Primary Examiner* — Kevin Quarterman
(74) *Attorney, Agent, or Firm* — The Belles Group, P.C.

(57) ABSTRACT

A display device including a light source and a light guide plate may be provided. The light guide plate includes: a light guiding part which guides light incident on a side thereof from the light source by total internal reflection; a fine pattern portion which emits the guided light only to an upper portion of the light guiding part; a guard ring portion which protects the fine pattern portion from the intrusion of impurities; and a light emitting member which is disposed on a top surface of the fine pattern portion and a top surface of the guard ring portion. The light guide plate is formed of a transparent material.

24 Claims, 7 Drawing Sheets

(a)    (b)

DISPLAY DEVICE AND LIGHT GUIDE PLATE

CROSS REFERENCE TO RELATED APPLICATIONS

Priority is claimed under 35 U.S.C. § 119 to Korean Patent Application No. 10-2018-0085004, filed Jul. 20, 2018, the disclosure of which is incorporated herein by reference in its entirety.

BACKGROUND

Field

The present disclosure relates to a display device and a light guide plate and more particularly to a display device and a light guide plate which emit light unidirectionally, are made of a transparent material, and protect themselves from the intrusion of external impurities.

Description of the Related Art

A transparent display can be used for consumer electronic products, transportation, industrial and military applications in the field of transparent devices. In particular, the transparent display which is applied to a windshield for a vehicle can transmit visual information and cause any form of glass to be paired with electronic devices, thereby improving security systems, etc.

A conventional light guide plate requires a separate reflective plate located opposite to the light emission direction in order that the unidirectional light emission is possible, which is why it is difficult to implement the transparent display.

Here, there is a requirement for implementing not only a transparent light guide plate but also a structure capable of emitting the light unidirectionally only. Simultaneously with this, there is also a demand for enhancing the optical reliability of the device by protecting the display device including the light guide plate from the intrusion of external impurities.

BRIEF SUMMARY

One embodiment is a display device including a light source and a light guide plate. The light guide plate includes: a light guiding part which guides light incident on a side thereof from the light source by total internal reflection; a fine pattern portion which emits the guided light only to an upper portion of the light guiding part; a guard ring portion which protects the fine pattern portion from the intrusion of impurities; and a light emitting member which is disposed on a top surface of the fine pattern portion and a top surface of the guard ring portion. The light guide plate is formed of a transparent material.

The guard ring portion may be formed to surround an outermost portion of the fine pattern portion on the light guiding part.

The adhesion of the fine pattern portion to the light guiding part may be complemented by adhesion between the guard ring portion and the light guiding part.

The fine pattern portion may include a plurality of microstructures. The guard ring portion may be formed by a plurality of guard rings. A width of a bottom surface of at least one of the plurality of guard rings may be greater than that of at least one of the plurality of microstructures.

The light guide plate may be manufactured by performing a first process of forming the fine pattern portion on the light emitting member and by a second process of adhering a bottom surface of the fine pattern portion to the light guiding part.

The light guide plate may be manufactured by performing a first process of forming the fine pattern portion on the light guiding part and a second process of adhering a top surface of the fine pattern portion to the light emitting member.

The display device may further include a frame which blocks the light which is emitted through the guard ring portion.

The display device may further include a controller for controlling an amount of the emitted light of the light guide plate.

The display device may be disposed toward a user, and the light emitted from the light guide plate may directly reach the user.

The display device may be disposed toward a front portion of a light receiving and reflecting body.

When the light is emitted in a dark environment, the light receiving and reflecting body may be identified by the light reflected from the light receiving and reflecting body.

The transparent material may further include Polymethylmethacrylate (PMMA), Styrenemethyl Methacrylate (SMMA), Cyclic olefin copolymer (COC), etc.

The guard ring portion and the fine pattern portion may be adhered to the light guiding part by using a predetermined adhesive, and the predetermined adhesive may include pressure sensitive adhesive (PSA), optically clear adhesive (OCA), optically clear resin (OCR), UV adhesive, oligomer, primer, silane coupling agent, silica-organic hybrid resins, etc.

The display device may further include a reflective tape which diffusely reflects a part of the light incident on the side thereof from the light source.

The light guide plate may include: a light guiding part which guides light incident on a side thereof from the light source by total internal reflection; a fine pattern portion which emits the guided light only to an upper portion of the light guiding part; a guard ring portion which protects the fine pattern portion from the intrusion of impurities; and a light emitting member which is disposed on a top surface of the fine pattern portion and a top surface of the guard ring portion. The light guide plate may be formed of a transparent material.

DETAILED DESCRIPTION

Figure 1A:
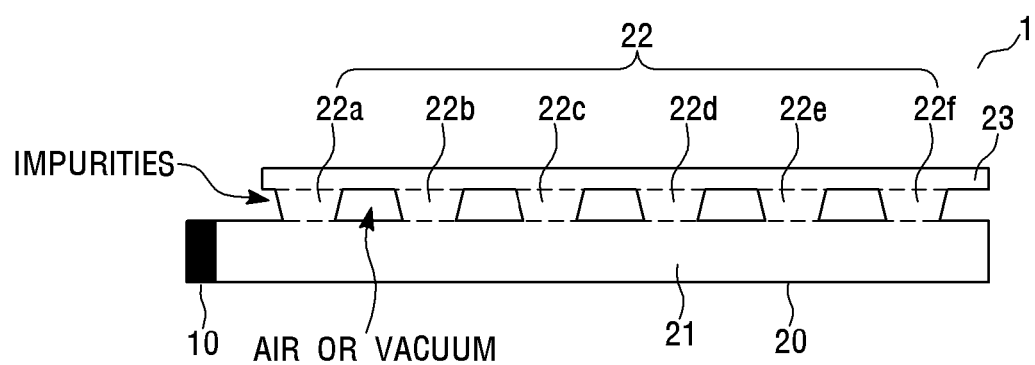
FIG. 1a is a cross sectional side view of the display device according to the embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a display device 1 according to an embodiment of the present invention will be described with reference to the accompanying drawings.

Figure 1B:
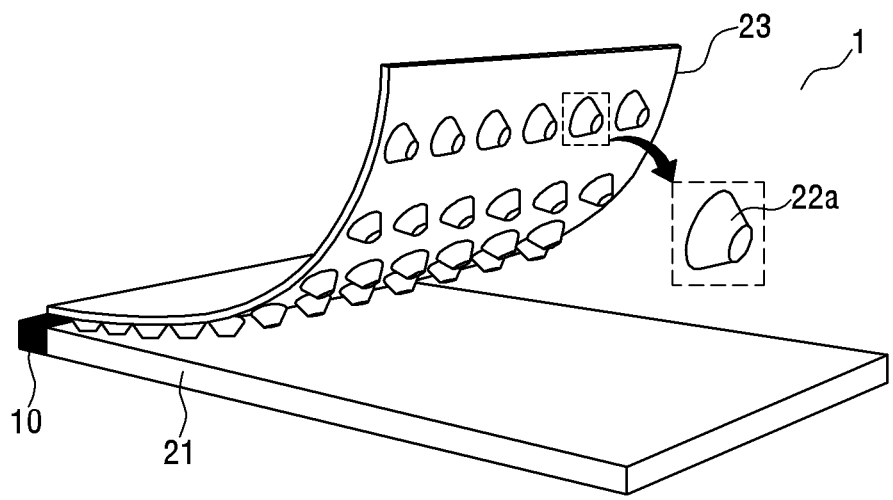
FIG. 1b is a perspective view of the display device according to the embodiment of the present invention.

FIG. 1a is a cross sectional side view of the display device 1 according to the embodiment of the present invention. FIG. 1b is an exploded view of the display device 1 according to the embodiment of the present invention.

As shown in FIGS. 1a and 1b, the display device 1 according to the embodiment of the present invention may include a light source 10 and a light guide plate 20. The light guide plate 20 may include a light guiding part 21, a fine pattern portion 22, and a light emitting member 23.

The light source 10 may be a light emitting diode (LED) or a cold-cathode fluorescent lamps (CCFL). However, this is just an embodiment, and other types of light sources can be applied to the present invention.

The light guide plate 20 converts a point light source supplied from the light source 10 into a surface light source and emits it. The embodiment of the present invention has a feature that the light guide plate is particularly formed of a transparent material and emits light unidirectionally. Since the light guide plate 20 is transparent and emits the light only toward the light emitting member 23 with respect to the upward light guiding part 21, a light receiving and reflecting body is visible only on one side of the light guide plate with respect to the light guide plate 20 and is not visible on a side opposite to the one side, so that the light guide plate can be variously applied. This will be described below in detail.

The light guiding part 21 guides the light incident on the side thereof from the light source 10 by total internal reflection.

Figure 1C:
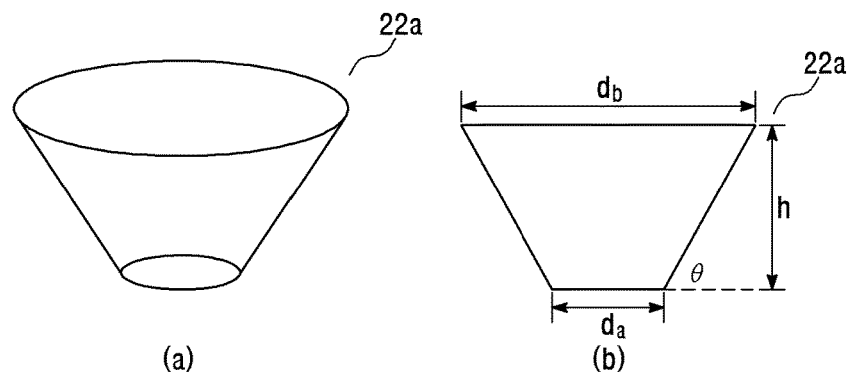
FIG. 1c is a view for describing the shape of a microstructure according to the embodiment of the present invention.

The fine pattern portion 22 may include a plurality of microstructures 22a to 22f so as to emit the guided light only to the upper portion of the light guiding part 21. The fine pattern portion 22 changes the direction of the light surface-diffused through the light guiding part 21 to a desired position, so that the light travels in the vertical direction. Therefore, the shapes, arrangements, pitches, etc., of the respective microstructures 22a to 22f constituting the fine pattern portion 22 may be an important factor for determining the light emission characteristics of the surface light source. Specifically, as shown in (a) of FIG. 1c, it is preferable that the shape of the microstructure 22a (only one is taken as an example) according to the embodiment of the present invention is a truncated conical shape. A cross-sectional side view of the microstructure 22a is shown in (b) of FIG. 1c. The area of the microstructure 22a can be calculated by the diameter $d_a$ of the bottom surface, the diameter $d_b$ of the top surface, the height h, and the inclined surface angle θ, etc. Among the above-mentioned elements, in particular, the element that has the greatest influence on the light emission characteristics is the inclined surface angle θ. The inclined surface angle θ can be calculated by analyzing the radiation characteristic of the emitted light and by reflecting the light path through which the largest amount of light is emitted. It is possible to determine whether the light emitted from the surface light source is emitted vertically or at a specific angle in accordance with the inclined surface angle θ. The radiation angle distribution can be controlled in various ways by using a method of distributing the microstructures 22a to 22f having various angles. In addition, the diameter $d_a$ of the bottom surface determines the size of the opening of the microstructure 22a, which can determine the amount of the emitted light, and the amount of the emitted light can be also determined according to the height h. In the embodiment of the present invention, the truncated conical shape is an optimized shape in which the light is diffused and emitted in the light guiding part 21. However, the embodiment of the present invention is not limited to this. Any shape having a predetermined inclination for changing the light path by analyzing the radiation characteristic of the emitted light can be variously applied to the microstructure 22a. For example, a shape (e.g., a cylindrical shape) having an inclined surface which is perpendicular or almost perpendicular to the top surface of the light guiding part 21 can be applied to the microstructure 22a. In the embodiment of the present invention, all of the microstructures 22a to 22f have the same size or shape. However, the display device 1 can be implemented with microstructures having various combinations of sizes and shapes according to the embodiment of the present invention.

The light emitting member 23 is disposed on the top surface of the fine pattern portion 22 and can also function as a protective film in accordance with the manufacturing method of the display device 1. However, this will be described below in detail.

All respective components shown in FIGS. 1a and 1b are not necessarily implemented. According to the embodiment, some of the components may be removed/modified.

In the display device 1 according to the embodiment of FIG. 1, as shown in FIG. 1a, when the light guiding part 21 and the fine pattern portion 22 which constitute the display device 1 adhere to each other, it is preferable that air is filled or a vacuum is applied between the plurality of microstructures 22a to 22f. However, in practice, in a specific environment, impurities such as moisture, dust, or the like penetrate easily. As a result, there may occur functional reliability problems or optical problems of the display device 1.

In addition, as shown in FIG. 1*b*, during the process of adhering of the microstructure 22*a* (only one is taken as an example) to the light guiding part 21, in order to improve the adhesion between the microstructure 22*a* and the light guiding part 21, it is important to enlarge the adhesive area between the microstructure 22*a* and the light guiding part 21. Particularly, as shown in FIG. 1*b*, when the microstructure 22*a* is implemented in the truncated conical shape, it may be very important to improve the adhesion between the bottom surface of the conical shape and the light guiding part 21.

Therefore, in the display device 1 according to another embodiment of the present invention, a separate guard ring portion 24 may be added in order to prevent the intrusion of external impurities and to enhance the adhesion between the microstructure 22*a* and the light guiding part 21.

Figure 2A:
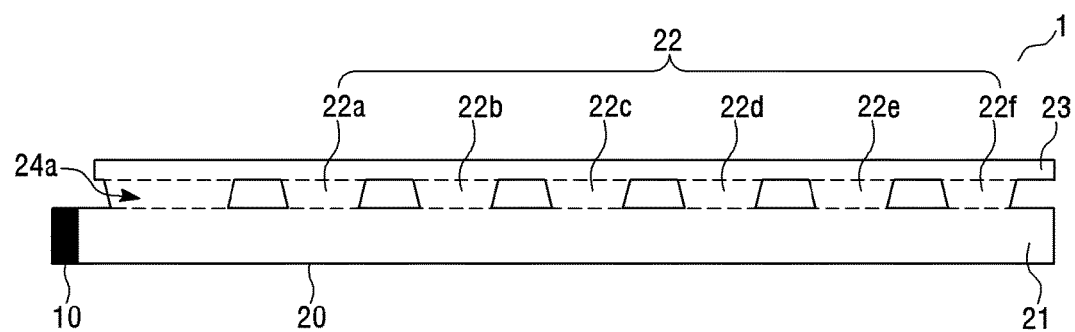
FIG. 2a is a cross-sectional side view of a display device according to another embodiment of the present invention.
Figure 2B:
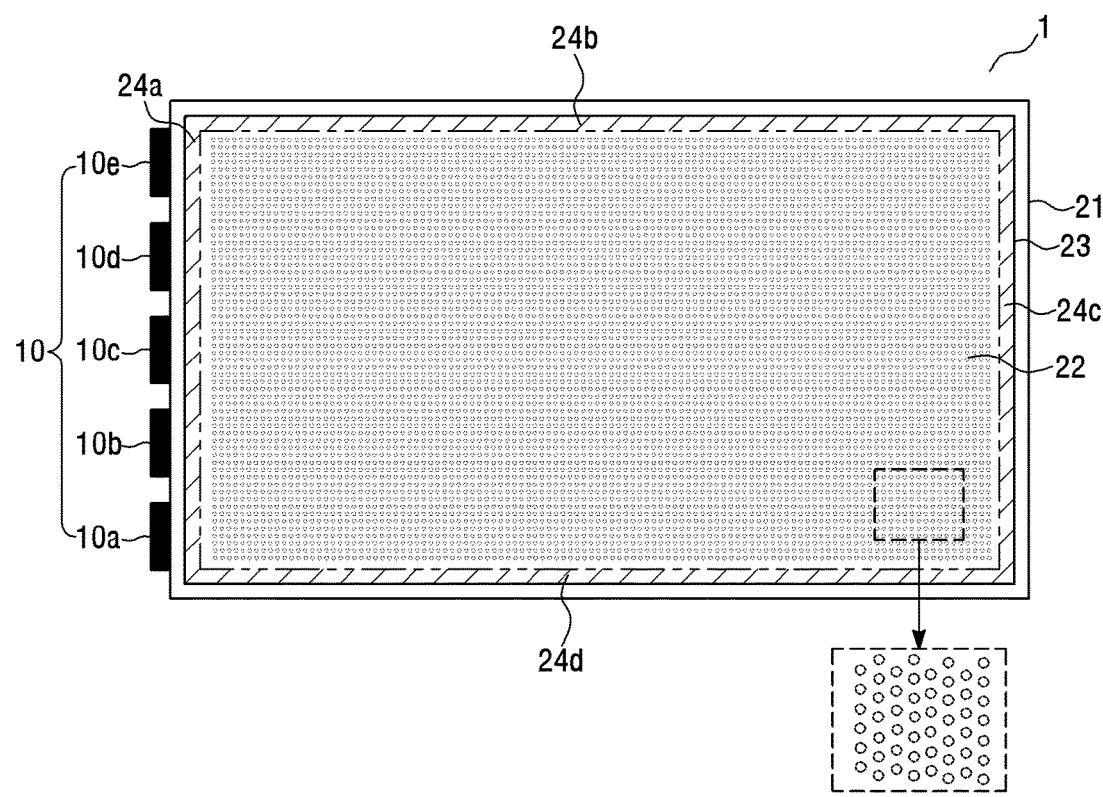
FIG. 2b is a view showing the entire surface of the display device according to the embodiment of the present invention.

FIG. 2*a* is a cross-sectional side view of the display device 1 including the guard ring portion 24 added thereto according to another embodiment of the present invention. FIG. 2*b* is a view showing the entire surface of the display device 1 including the guard ring portion 24 added thereto according to the embodiment of the present invention.

The respective functions of the light source 10, the light guiding part 21, the fine pattern portion 22, and the light emitting member 23 can be applied in the same manner as or a similar manner to that described with reference to FIGS. 1*a* and 1*b*.

As shown in FIGS. 2*a* and 2*b*, a plurality of the light sources 10*a* to 10*e* may be arranged on one side of the display device 1. The light sources 10 are disposed only on one side instead of being entirely disposed on the display device 1, so that the number of the light sources 10 can be reduced. Therefore, the display device 1 according to the embodiment of the present invention can be implemented with only a small number of light sources 10, and thus, a more efficient display device 1 can be implemented at a lower cost. In FIG. 2*b*, the light source 10 is disposed only on one side of the four sides of the display device 1. However, this is only an example. According to the embodiment, the light source 10 can be further disposed on two or more sides.

As shown in FIGS. 2*a* and 2*b*, the guard ring portion 24 may be formed to surround the outermost portion of the fine pattern portion 22 on the light guiding part 21. The guard ring portion 24 includes a plurality of guard rings 24*a* to 24*d* and each of the plurality of guard rings 24*a* to 24*d* is formed to surround the outermost portion of the fine pattern portion 22. Therefore, it is possible to effectively prevent the intrusion of impurities between the microstructures 22*a* to 22*f*. Here, the guard ring portion 24 formed to surround the outermost portion of the fine pattern portion 22 may be integrally formed with the fine pattern portion 22 in accordance with the embodiment. Alternatively, according to another embodiment, the guard ring portion 24 is formed separately from the fine pattern portion 22 and then adheres to the fine pattern portion 22 by a predetermined adhesive, so that the light guide plate 20 can be formed. Particularly, in the above-described embodiment, the guard ring portion 24 can be formed by extending the microstructure located at the outermost portion in the process of manufacturing the fine pattern portion 22.

According to another embodiment, the guard ring portion 24 may be disposed on an area of the fine pattern portion 22. For example, the guard ring portion 24 may be disposed close to the middle area of the fine pattern portion 22. However, this is an embodiment. Some of the plurality of guard rings may be disposed at the outermost portion of the fine pattern portion 22, and the remaining guard rings of the plurality of guard rings may be disposed on an area of the fine pattern portion 22.

Meanwhile, the guard ring portion 24 adheres to the light guiding part 21, so that the adhesion of the fine pattern portion 22 to the light guiding part 21 can be complemented.

Specifically, in the manufacturing process of the display device 1 in which the fine pattern portion 22 adheres to the light guiding part 21, problems may occur in the adhesion, depending on the shape of the adhesion cross section of the fine pattern portion 22. When the adhesion cross section of the plurality of microstructures 22*a* to 22*f* according to the embodiment of the present invention to the light guiding part 21 has, as described above, the truncated conical shape, the adhesion may be relatively low. Therefore, additional adhesion of the bottom surface of the guard ring portion 24 to the light guiding part 21 can complement the adhesion of the fine pattern portion 22 to the light guiding part 21.

Here, the width of the bottom surface of at least one 24*a* of the plurality of guard rings can be formed to be greater than that of at least one 22*a* of the plurality of microstructures. That is, the size of the adhesion surface of the guard ring 24*a* to the light guiding part 21 is intended to be larger than the size of the adhesion surface of the microstructure 22*a* to the light guiding part 21, so that the microstructure 22*a* can more firmly adhere to the light guiding part 21.

In addition, in the embodiment of FIG. 2*a*, the width of the top surface of at least one 24*a* of the plurality of guard rings is formed to be greater than that of at least one 22*a* of the plurality of microstructures. Through this, the adhesion of the fine pattern portion 22 to the light emitting member 23 can be complemented.

For reference, a light guiding part 21-fine pattern portion 22-light emitting member 23 layer can be formed by a different manufacturing process of the display device 1 according to the embodiment of the present invention.

Figure 3A:
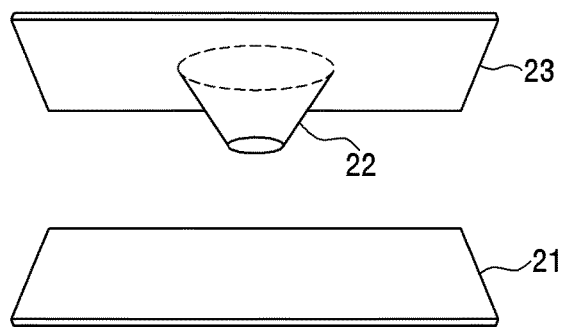
FIGS. 3a to 3b are views for describing manufacturing processes of the display device according to embodiments of the present invention.

According to a first embodiment, as shown in FIG. 3*a*, the light guide plate 20 may be manufactured by a first process of forming the fine pattern portion 22 on the light emitting member 23 and by a second process of adhering the bottom surface of the fine pattern portion 22 to the light guiding part 21. That is, according to the first embodiment, first, after the fine pattern portion 22 is formed on the light emitting member 23, the bottom surface of the fine pattern portion 22 integrated with the light emitting member 23 adheres to the light guiding part 21. In this case, while it is easy to transfer the fine pattern portion 22 and to manufacture the light guide plate 20, the adhesion of the fine pattern portion 22 to the light guiding part 21 may be low. Therefore, the light guide plate can be manufactured in the manner of complementing the adhesion by adding the separate guard ring portion 24 described in FIG. 2.

Figure 3B:
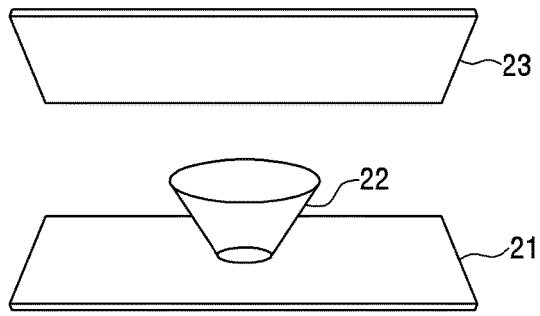

According to a second embodiment, as shown in FIG. 3*b*, the light guide plate 20 can be manufactured by performing a first process of forming the fine pattern portion 22 on the light guiding part 21 and a second process of adhering the top surface of the fine pattern portion 22 to the light emitting member 23. That is, in the second embodiment, the light guide plate can be manufactured in the manner in which, first, after the fine pattern portion 22 is formed on the light guiding part 21, the top surface of the fine pattern portion 22 adheres to the light emitting member 23. In this case, the light emitting member 23 can also serve as a protective film for protecting the fine pattern portion 22.

Also, the light guide plate 20 implemented by the first embodiment or the second embodiment can prevent the loss of the light passing through the opening of the fine pattern portion 22 when the light guiding part 21 and the fine pattern portion 22 are made of the same material.

In the embodiment of the present invention, although the plurality of guard rings 24a to 24d and the plurality of microstructures 22a to 22f have the truncated conical shape, the scope of the right of the present invention is not limited thereto. Specifically, in the case of the plurality of microstructures 22a to 22f, all types of microstructures 22a having a predetermined inclination for changing the light path by analyzing the radiation characteristic of the emitted light can be variously applied to the embodiment of the present invention. For example, the microstructure 22a (e.g., a cylindrical shape) having an inclined surface which is perpendicular or almost perpendicular to the top surface of the light guiding part 21 can be applied to the embodiment of the present invention.

Meanwhile, the light diffused through the light guiding part 21 may be emitted through the guard ring portion 24, in other words, may be emitted not only through the fine pattern portion 22 but also through the guard ring portion 24. According to the embodiment, there is a need to limit the light emission through the guard ring portion 24 in accordance with the manufacturing situation of the display device 1.

Figure 4:
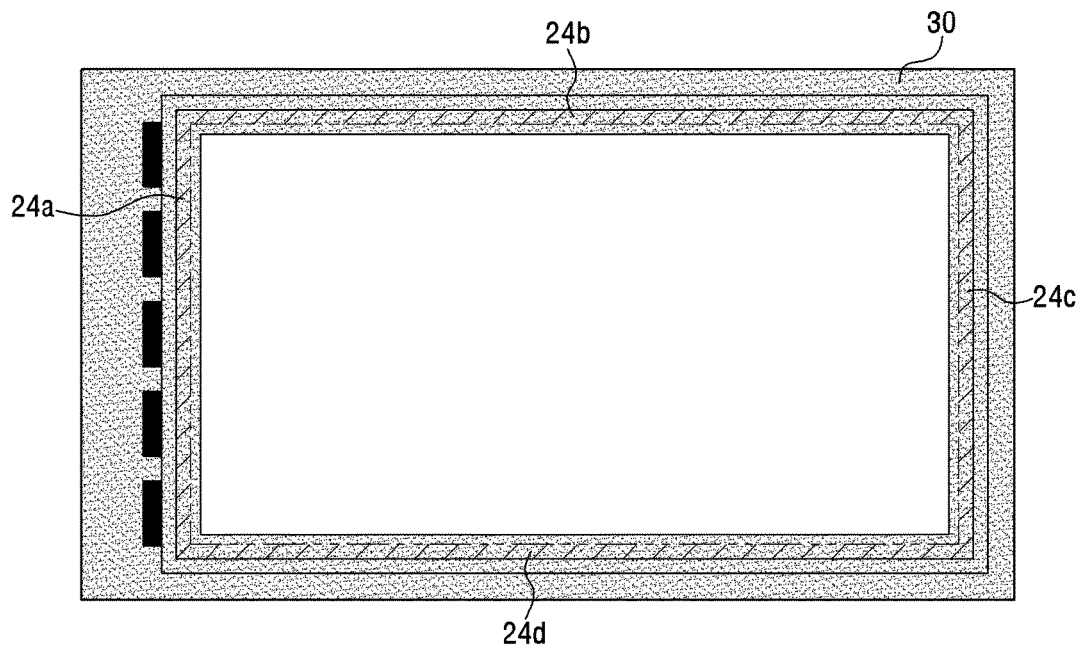
FIG. 4 is a view for describing a frame added according to further another embodiment of the present invention.

For this, it is possible to limit the light emission through the guard ring portion 24 by adding a separate frame 30 as shown in FIG. 4. It is also possible to limit the light emission through the guard ring portion 24 by adding a separate metal film (not shown) for the reflection between the guard ring portion 24 and the light guiding part 21. In FIG. 4, the light emission is limited by adding the frame to all the plurality of guard rings 24a to 24d. However, according to the embodiment, the light emission may be limited by adding the frame to only a portion of the guard rings or by adding the metal film (not shown) to only a portion of the guard rings.

Up to now, the display device 1 to which the guard ring portion 24 is added according to the embodiment of the present invention has been described. Hereinafter, various applications which control the display device 1 including a separate controller (not shown) will be described.

The light guide plate 20 according to the embodiment of the present invention can function as a transparent surface light source. A controller (not shown) of the transparent surface light source controls the light sources 10. A surface optical sheet of the transparent surface light source is a passive element and its characteristics and roles are determined at the time of manufacturing itself. It is the light source 10 that can be controlled in the transparent surface light source. As described above, conventional light sources such as CCFL, LED, etc., can be used as the light source 10 of the transparent surface light source. Among them, the LED is used as a source of most surface light sources because the LED has high light efficiency, low power consumption, etc. Since the LED is a light source having a point shape, it is common that the LED is used in the form of a bar composed of a plurality of LEDs in order to be used as a source of the surface light source having a large area. Here, various functions can be assigned to the LED bar through the controller (not shown).

The light source 10 can be controlled by the controller (not shown) in various ways.

The controller (not shown) can control the ON/OFF of the light guide plate 20 by the ON/OFF of the light source 10. The controller (not shown) may include a timer function of controlling the light source 10 to be ON/OFF for a certain period of time and then, in response to this, of controlling the light guide plate 20 to be ON/OFF for a certain period of time. The controller (not shown) can adjust the intensity of the light emitted from the light guide plate 20, by controlling the amount of current flowing through the light source 10. The controller (not shown) can control sequentially/selectively a plurality of the light sources 10a to 10e to be ON/OFF. The controller (not shown) can also control the color of the light emitted from the light guide plate 20 by changing the color of the light source 10. The display device 1 may be supplied with power through an internal battery or may be supplied with power through an external device (not shown), and the controller (not shown) can selectively control the power.

In addition, the controller (not shown) can also control the display device 1 in association with various kinds of sensors.

In association with a motion detection sensor (not shown) for detecting the motion of an external object, the controller (not shown) can control the ON/OFF of the light emitted from the light guide plate 20. In association with an illuminance sensor (not shown), the controller (not shown) can also control the ON/OFF of the light guide plate 20 or control the brightness of the light guide plate 20 in accordance with the amount of light received by the periphery thereof. In association with a gas sensor (not shown), when gas is detected in the vicinity, the controller (not shown) can the ON/OFF of the light guide plate 20. In association with a pressure sensor, when a force or pressure greater than a predetermined magnitude is applied, the controller (not shown) can the ON/OFF of the light guide plate 20. However, the sensor exemplified in this specification is only one example, and all kinds of sensors used in a smartphone or Internet Of Things (IoT), etc., can be used in association with the controller (not shown).

According to the first embodiment, the display device 1 according to the embodiment of the present invention can be applied through the use of the characteristic that the light is directly emitted to a user. More specifically, the light guide plate 20 is transparent and not visible in the dark state, and when the light is emitted from the light guide plate 20, the user (observer) is able to see the light directly. Therefore, the transparency of the light guide plate 20 according to the first embodiment is meaningful in that the light guide plate is not visible in the state where the light is not provided, and is visible only when power is supplied.

Figure 5:
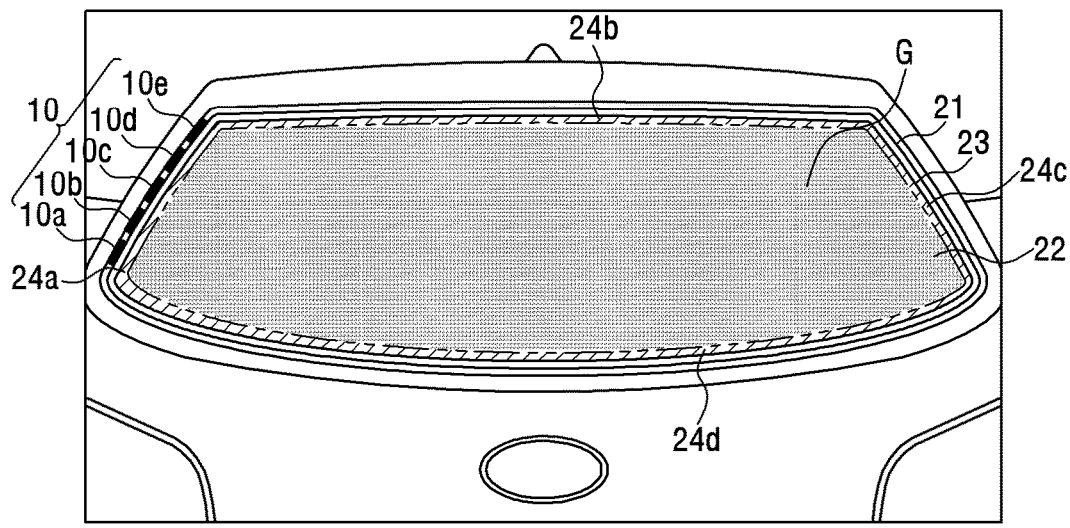
FIG. 5 is a view for describing a case where the display device according to the embodiment of the present invention is a vehicle display device.

As shown in FIG. 5, when the display device 1 according to the embodiment of the present invention is a display device for a vehicle, the controller (not shown) of the display device 1 can control to transfer the state of the vehicle by using the amount of the emitted light of the light guide plate 20. For example, it is assumed that the light guide plate 20 is implemented as the rear glass G of the front vehicle and the light source 10 is installed, when the light is emitted from the rear glass G, the driver of the rear vehicle can directly see the light emitted from the rear glass G of the front vehicle. It is possible to transfer emergencies to the driver of the rear vehicle by using the light emitted from the display device 1 of the front vehicle. Here, the electric power may be supplied from an emergency light of the vehicle to the light source 10, and the light source 10 is linked with the brake of the vehicle and blinks each time the brake is activated. Under the control of the controller (not shown) of the display device 1, by using the power supplied to the light source 10, it is possible to determine whether or not light is emitted from the light guide plate 20 or adjust the amount of the emitted light. In addition, the intensity of the light can be adjusted by emitting the light with different amounts depending on the degree of braking. According to the embodiment described above, since the driver of the rear vehicle can directly see the light emitted from the rear glass G of the front vehicle and cannot see the inside of the front vehicle (due to the unidirectional light emission). Therefore, there is an effect of not only maximizing the transfer of the state of the front vehicle to the rear vehicle but also protecting the privacy of the driver of the front vehicle. According to another embodiment, the display device 1 according to the embodiment of the present invention may be implemented by a privacy lighting film (PLF).

Figure 6:
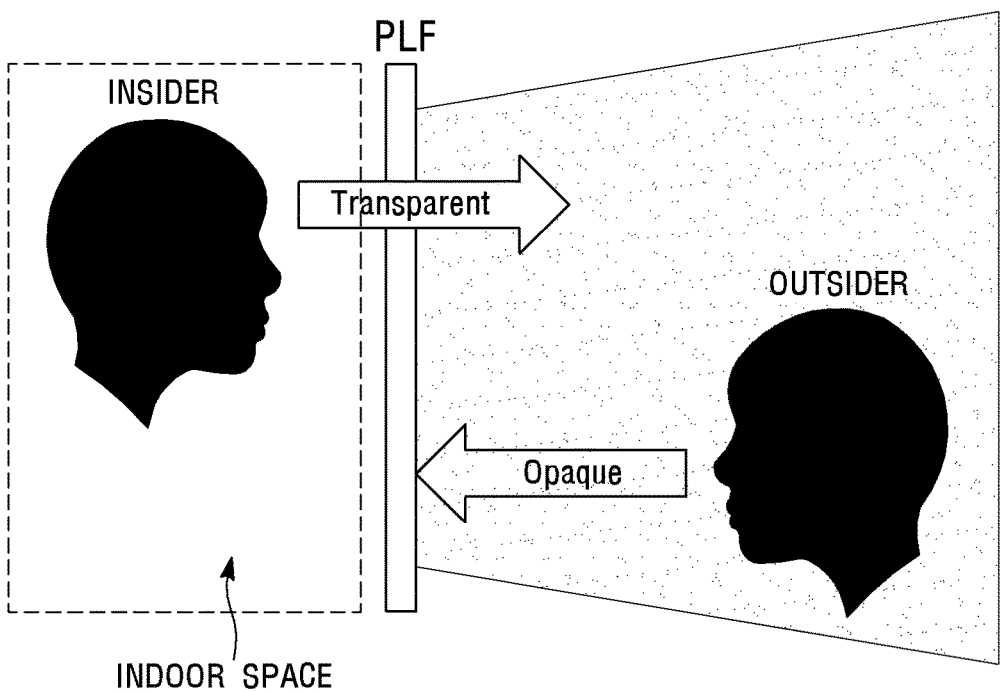
FIG. 6 is a view for describing an application example of the display device according to the embodiment of the present invention.

Demand for the privacy lighting film which is applied to a window in order to protect privacy in an indoor space is gradually increasing. A conventional privacy lighting film protects the privacy by reflecting sunlight in the daytime. However, at night, there is a concern that the inside space may be exposed because the inside becomes brighter than the outside due to the turning on of the indoor lighting. Meanwhile, when the transparent surface light source which emits light unidirectionally in accordance with the embodiment of the present invention is used, the inside cannot be, as shown in FIG. 6, seen by outsiders because the emitted light is directed only to the outside. Therefore the privacy can be easily protected. In FIG. 6, by applying the same principle as that of FIG. 5, the light emitted from the privacy lighting film (PLF) directly reaches the outsider, not only the light is provided to the outsider, but also the outsider cannot see the inside space. In other words, the biggest advantage is that the visibility of the outsider can be reduced.

Additionally, in the first embodiment, the transparent surface light source is installed inside a building and is used to illuminate the inside of the building. This uses the foregoing transparency. The transparent surface light source is transparent in the dark state, and thus, the display device 1 is not visible. However, in a bright state, the light can be directly emitted toward the user (observer). Alternatively, the transparent surface light source is installed on the exterior wall of the building and produces an effect that the exterior wall of the building shines brightly. However, in this case, since the light does not enter the inside of the building, people located inside the building may not be disturbed by this light.

While the first embodiment utilizes the feature that the user (observer) can directly see the light emitted from the display device 1, the second embodiment shows an example in which the light emitted from the display device 1 is reflected from the light receiving and reflecting body and the generated reflected light is utilized. That is, while both only the light guide plate 20 and only the user (observer) who looks toward the light guide plate 20 are required in order to construct the first embodiment, the light guide plate 20, and the user (observer) and the light receiving and reflecting body (not shown) which are located opposite to each other and have the light guide plate 20 therebetween are required to construct the second embodiment. That is, according to the second embodiment, it is necessary that the user (observer), the light guide plate 20, and the light receiving and reflecting body (not shown) are arranged in the order listed.

Further, while the transparency of the light guide plate 20 of the first embodiment is meaningful in that the display device 1 is not visible in the dark state, the transparency of the light guide plate 20 of the second embodiment is meaningful in that the user who is located opposite to the light receiving and reflecting body (not shown) can see the light reflected from the light receiving and reflecting body (not shown).

According to the second embodiment, the display device 1 according to the embodiment of the present invention can be implemented as a front light sheet which emits light in front of the light receiving and reflecting body.

Specifically, the display device 1 is disposed toward the front portion of the light receiving and reflecting body, and in particular, when the light is emitted from the display device 1 in a dark environment, the light receiving and reflecting body can be identified by the light reflected from the light receiving and reflecting body. Since the light guide plate 20 according to the embodiment of the present invention is made of a transparent material, the content and texture of the light receiving and reflecting body can be represented as they are in a bright environment. In a dark environment, when the light source 10 is turned on, the light source 10 illuminates the light receiving and reflecting body, so that the light receiving and reflecting body can be identified. Similarly, the display device 1 is installed on the front side of the light receiving and reflecting body and can be applied to an outdoor billboard that can be advertised even at night. Alternatively, when the light receiving and reflecting body is a printed matter, the display device 1 can be applied to a real estate window, a frame, a bulletin board, and the like. Even though a separate printed light receiving and reflecting body is not provided, the display device 1 can be implemented by a method of forming the light receiving and reflecting body as an image on the wall of the building. For example, when an image of an arrow mark is formed on the wall of the movie theater because the interior of the movie theater is dark, the display device 1 emits the light and illuminates the arrow mark in the dark environment. Therefore, people in the movie theater cannot get lost even in the dark environment. The display device 1 according to the embodiment of the present invention can also be implemented as a portable display device 1. For example, when a user carries the display device 1 and turns on the light source in a dark environment, the user illuminates only a space selected to illuminate (for example, when the user reads a book, a space where the book is placed), so that there is an advantage that an area only for the user can be protected while not affecting others. The portable display device 1 may be also implemented to be detachable and attachable. When the display device 1 according to the embodiment of the present invention is implemented on a traffic sign at a place where a headlamp of a vehicle does not illuminate at night or where there is no street light, the traffic sign can be illuminated even at night. Thus, it is enough to attach the display device 1 on the traffic sign, and the traffic sign does not need to be replaced.

Besides, the light source 10 is applied not only to the visible light region but also to UV region and IR region so that a variety of effects can be obtained. For example, the display device 1 can be applied not only to a product showing therapeutic effect by using light but also to optical medical equipment for catalyzing drugs and enhancing the effectiveness of the drugs. The display device 1 can be also applied to products using light such as medical equipment for inducing vitamin D synthesis by using the UV region, skin care using an IR light source, an infrared therapy device, medical lighting, catalytic function for drugs, etc.

The display device 1 according to the embodiment of the present invention has an edge-lit type in which the light source 10 is provided on the side thereof. The transparent surface light source having a smaller number of the light sources 10 and improved uniformity can be implemented. Also, the display device 1 can be applied to a flexible material, so that it can be directly attached to skin or can be applied to lightweight devices.

Various applications of the controller (not shown) of the present invention have been described on the basis of FIGS. 5 and 6. Hereinafter, the materials of respective parts constituting the display device 1 of the present invention will be described.

The guard ring portion 24 and the fine pattern portion 22 according to the embodiment of the present invention may be adhered to the light guiding part 21 by using a predetermined adhesive, for example, pressure sensitive adhesive (PSA), optically clear adhesive (OCA), optically clear resin (OCR), UV adhesive, oligomer, primer, silane coupling agent, silica-organic hybrid resins, water based PVAc adhesives, etc. According to the embodiment, an adhesive for adhering the guard ring portion 24 to the light guiding part 21 may be the same as or not the same as an adhesive for adhering the fine pattern portion 22 to the light guiding part 21.

The light guide plate 20 according to the embodiment of the present invention may be formed of a transparent material, for example, Polymethylmethacrylate (PMMA), Styrenemethyl Methacrylate (SMMA), Cyclic olefin copolymer (COC), AryLite, Polycarbonate, Polyethyleneterephtalate (PET), Polyimide (PI), Polyethylene (PE), Polyethersulfone (PES), PO (Polyolefin), Polyvinylalcohol (PVA), Polyvinylchloride (PVC), Triacetylcellulose (TAC), Polystylene (PS), Polypropylene (PP), Acrylonitrile Butadiene Styrene (ABS), Styrene Acrylonitrile (SAN/AS), Polyethylene Naphthalate (PEN), Polytrimethylene Terephthalate (PTT), Polyurethane (PU), Polyurethane Acrylate (PUA), Thermoplastic Polyurethane (TPU), Polyarylate (PAR), Silicone, Polydimethylsiloxane (PDMS). However, they are only shown as one embodiment. The scope of the right of the present invention is not limited thereto.

Hereinafter, a light emission mechanism of the display device 1 according to the embodiment of the present invention and a reflective tape which is implemented to prevent a light leakage phenomenon during light emission in the display device 1 will be described.

Figure 7:
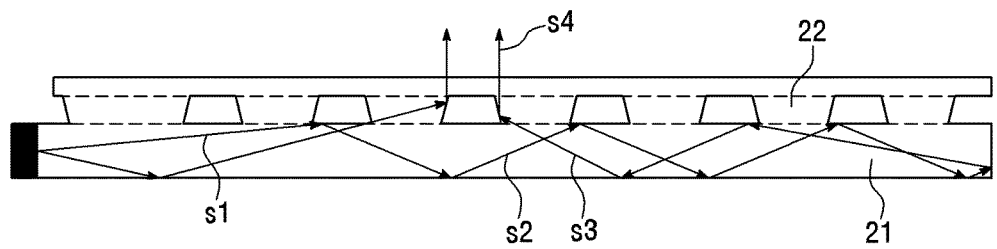
FIG. 7 is a view for describing a light emission mechanism of the display device according to the embodiment of the present invention.

As shown in FIG. 7, the light emission mechanism of the display device 1 according to the embodiment of the present invention may be composed of light incident on the light guiding part 21 of the light source 10 [s1]→total internal reflection through the light guiding part 21 [s2]→light passing through the opening of the fine pattern portion 22 [s3]→light outwardly emitted through the total internal reflection in the fine pattern portion 22 [s4].

Here, the total internal reflection must occur in the light guiding part 21 in order that the light incident from the light source 10 is diffused in the light guiding part 21. For this, there must be a condition that the light is transmitted from a medium with a high density (with a high reflective index) to a medium with a low density (with a low reflective index) and the light must be incident from the light source 10 at an angle less than a critical angle. Here, it is preferable that the outside of the light guiding part 21 is air or vacuum.

The fine pattern portion 22 and the light guiding part 21 may or may not be made of the same material. However, the same material is more preferable for causing the total internal reflection. However, even though the fine pattern portion 22 and the light guiding part 21 are formed of different materials, the fine pattern portion 22 and the light guiding part 21 are made of materials having a small refractive index difference therebetween, so that the light passing through the opening of the fine pattern portion 22 is totally reflected or is less refracted.

Figure 8A:
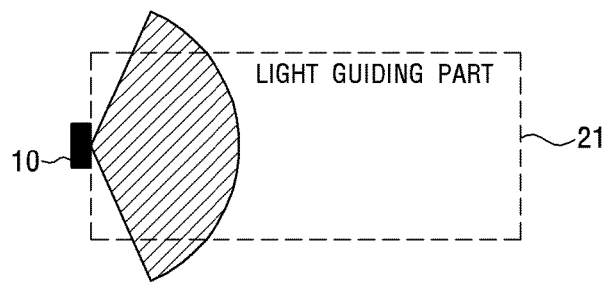
FIGS. 8a to 8c are views for describing a reflective tape which is implemented to prevent a light leakage phenomenon during light emission in the display device according to the embodiment of the present invention.
Figure 8B:
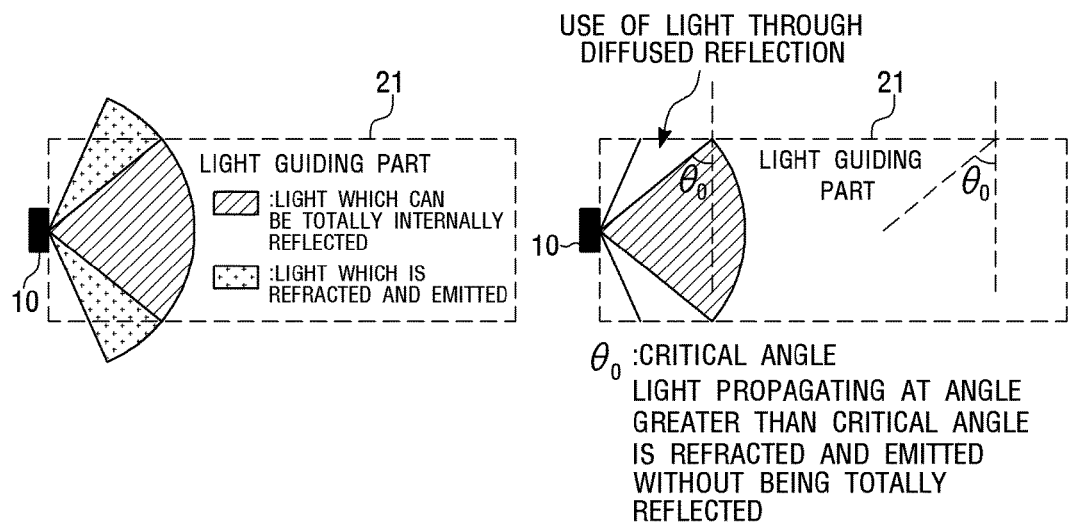
Figure 8C:
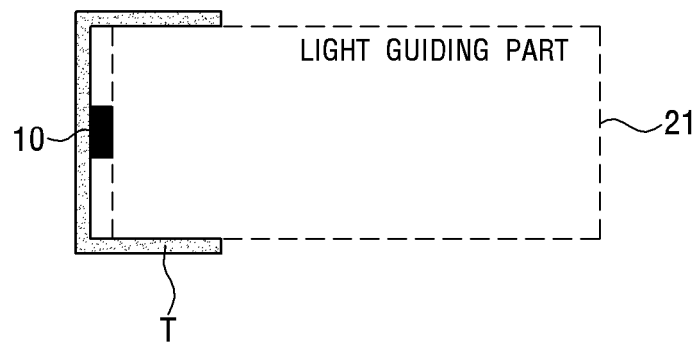

FIGS. 8a to 8c are views for describing the reflective tape T which is implemented in the display device 1 to prevent a light leakage phenomenon during light emission.

As shown in FIGS. 8a to 8b, in the process in which the light is incident from the light source 10 to the light guiding part 21, the light may be scattered or reflected depending on the surface roughness of the side of the light guiding part 21, thereby causing the light leakage phenomenon. Unlike the light totally internally reflected, the refracted and emitted light causes optical loss and forms a light leakage region which brightens a corresponding portion and causes glare. In order to prevent this, it is necessary to scatter or diffuse the light propagating at an angle equal to or greater than a critical angle θ0 and then to recycle the light, and to block the light which is refracted and emitted (here, the critical angle θ0 determines a boundary between the light which is totally internally reflected and the light which is refracted and emitted). Therefore, as shown in FIG. 8c, the light leakage phenomenon can be prevented by attaching a separate reflective tape T to the light source 10 side. Specifically, the reflective tape T has a "⊏" shape (a quadrangular shape having one open side) and may be formed in a shape that covers the entrance of the top surface and the entrance of the bottom surface of the light guiding part 21. In FIG. 8, the reflective tape T is formed to cover the entire surface including the entrance of the top surface and the entrance of the bottom surface of the light guiding part 21. However, according to the embodiment, the reflective tape T may be formed to cover only a partial surface of the light guiding part 21. According to an embodiment, the reflective tape T may be made of a metal material.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A display device comprising:
   a light source; and
   a light guide plate,
      wherein the light guide plate comprises:
         a light guiding part which guides light incident on a side thereof from the light source by total internal reflection;
         a fine pattern portion which emits the guided light only to an upper portion of the light guiding part;
         a guard ring portion which protects the fine pattern portion from the intrusion of impurities; and a light emitting member which is disposed on a top surface of the fine pattern portion and a top surface of the guard ring portion, and wherein the light guide plate is formed of a transparent material.

2. The display device of claim 1, wherein the guard ring portion is formed to surround an outermost portion of the fine pattern portion on the light guiding part.

3. The display device of claim 1, wherein adhesion of the fine pattern portion to the light guiding part is complemented by adhesion between the guard ring portion and the light guiding part.

4. The display device of claim 1,
wherein the fine pattern portion comprises a plurality of microstructures,
wherein the guard ring portion is formed by a plurality of guard rings,
and wherein a width of a bottom surface of at least one of the plurality of guard rings is greater than that of at least one of the plurality of microstructures.

5. The display device of claim 1, wherein the light guide plate is manufactured by performing a first process of forming the fine pattern portion on the light emitting member and by a second process of adhering a bottom surface of the fine pattern portion to the light guiding part.

6. The display device of claim 1, wherein the light guide plate is manufactured by performing a first process of forming the fine pattern portion on the light guiding part and a second process of adhering a top surface of the fine pattern portion to the light emitting member.

7. The display device of claim 1, further comprising a frame which blocks the light which is emitted through the guard ring portion.

8. The display device of claim 1, further comprising a controller for controlling an amount of the emitted light of the light guide plate.

9. The display device of claim 1, wherein the display device is disposed toward a user, and wherein the light emitted from the light guide plate directly reaches the user.

10. The display device of claim 1, wherein the display device is disposed toward a front portion of a light receiving and reflecting body, and wherein, when the light is emitted in a dark environment, the light receiving and reflecting body is identified by the light reflected from the light receiving and reflecting body.

11. The display device of claim 1, wherein the transparent material comprises Polymethylmethacrylate (PMMA), Styrenemethyl Methacrylate (SMMA), Cyclic olefin copolymer (COC), etc.

12. The display device of claim 1, wherein the guard ring portion and the fine pattern portion are adhered to the light guiding part by using a predetermined adhesive, and wherein the predetermined adhesive comprises pressure sensitive adhesive (PSA), optically clear adhesive (OCA), optically clear resin (OCR), UV adhesive, oligomer, primer, silane coupling agent, silica-organic hybrid resins, etc.

13. The display device of claim 1, further comprising a reflective tape which diffusely reflects a part of the light incident on the side thereof from the light source.

14. A light guide plate comprising:
a light guiding part which guides light incident on a side thereof from the light source by total internal reflection;
a fine pattern portion which emits the guided light only to an upper portion of the light guiding part;
a guard ring portion which protects the fine pattern portion from the intrusion of impurities; and
a light emitting member which is disposed on a top surface of the fine pattern portion and a top surface of the guard ring portion,
and wherein the light guide plate is formed of a transparent material.

15. The light guide plate of claim 14, wherein the guard ring portion is formed to surround an outermost portion of the fine pattern portion on the light guiding part.

16. The light guide plate of claim 14, wherein adhesion of the fine pattern portion to the light guiding part is complemented by adhesion between the guard ring portion and the light guiding part.

17. The light guide plate of claim 14,
wherein the fine pattern portion comprises a plurality of microstructures,
wherein the guard ring portion is formed by a plurality of guard rings,
and wherein a width of a bottom surface of at least one of the plurality of guard rings is greater than that of at least one of the plurality of microstructures.

18. The light guide plate of claim 14, wherein the light guide plate is manufactured by performing a first process of forming the fine pattern portion on the light emitting member and by a second process of adhering a bottom surface of the fine pattern portion to the light guiding part.

19. The light guide plate of claim 14, wherein the light guide plate is manufactured by performing a first process of forming the fine pattern portion on the light guiding part and a second process of adhering a top surface of the fine pattern portion to the light emitting member.

20. The light guide plate of claim 14, further comprising a frame which blocks the light which is emitted through the guard ring portion.

21. The light guide plate of claim 14, wherein the transparent material comprises Polymethylmethacrylate (PMMA), Styrenemethyl Methacrylate (SMMA), Cyclic olefin copolymer (COC), etc.

22. The light guide plate of claim 14, wherein the guard ring portion and the fine pattern portion are adhered to the light guiding part by using a predetermined adhesive, and wherein the predetermined adhesive comprises pressure sensitive adhesive (PSA), optically clear adhesive (OCA), optically clear resin (OCR), UV adhesive, oligomer, primer, silane coupling agent, silica-organic hybrid resins, etc.

23. The light guide plate of claim 14, wherein the light guide plate is disposed toward a user, and wherein the light emitted from the light guide plate directly reaches the user.

24. The light guide plate of claim 14, wherein the light guide plate is disposed toward a front portion of a light receiving and reflecting body, and wherein, when the light is emitted in a dark environment, the light receiving and reflecting body is identified by the light reflected from the light receiving and reflecting body.

* * * * *

UNITED STATES PATENT AND TRADEMARK OFFICE
CERTIFICATE OF CORRECTION

PATENT NO. : 10,459,148 B1  
APPLICATION NO. : 16/114869  
DATED : October 29, 2019  
INVENTOR(S) : Jun-Bo Yoon, Keun-Seo Lim and Shin-Ae Hwang Page 1 of 1

It is certified that error appears in the above-identified patent and that said Letters Patent is hereby corrected as shown below:

On the Title Page

Item (72), Line 1, delete the following inventor:
"Jun-Bo Yoon, Daejeon (KR)"

Signed and Sealed this
Twenty-sixth Day of May, 2020

Andrei Iancu
*Director of the United States Patent and Trademark Office*